United States Patent Office 3,763,088
Patented Oct. 2, 1973

3,763,088
GLASS FIBER REINFORCED THERMOPLASTIC
RESINOUS COMPOSITION
Shinichi Izawa, Tokyo, and Kunio Toyama, Kanagawa, Japan, assignors to Asahi-Dow Limited, Tokyo, Japan
No Drawing. Filed Dec. 14, 1971, Ser. No. 207,949
Claims priority, application Japan, Dec. 28, 1970, 46/120,515
Int. Cl. C08d 9/10
U.S. Cl. 260—41.5 A         13 Claims

ABSTRACT OF THE DISCLOSURE

A novel glass fiber reinforced thermoplastic resinous composition is prepared by adding glass fibers to a resinous composition made of 99.5 to 55 wt. percent noncrystalline thermoplastic resins such as styrene type resins, polyphenylene ether resins, aromatic polycarbonate resins, aromatic polysulphone resins and the like, and 0.5 to 45 wt. percent uncured epoxy resins, in an amount of 5 to 50 percent by weight based on the total weight of said resinous composition. This glass fiber reinforced thermoplastic resinous composition, having improved impact strength as well excellent molding processability, is suitable for making a large scale shaped article or a shaped article having a complicated structure.

FIELD OF THE INVENTION

The present invention relates to a novel glass fiber reinforced thermoplastic resinous composition. More particularly, the invention pertains to a glass fiber reinforced thermoplastic resinous composition which is obtained by adding glass fibers to a resinous composition comprising thermoplastic resins such as a styrene type resin, a polyphenylene ether resin, a mixture of a styrene type resin with polyphenylene ether resin, an aromatic polycarbonate resin, an aromatic polysulphone resin and the like wherein uncured epoxy resins are homogeneously admixed.

BACKGROUND OF THE INVENTION

It is well known to improve mechanical properties, thermal properties or the like of thermoplastic resins by admixing therewith reinforcing glass fibers. Such glass fiber reinforced thermoplastic resins are improved in impact strength, tensile strength, flexural strength, heat distortion temperature, thermal expansion coefficient, dimensional stability and the like. On the other hand, however, the molding processability of thermoplastic resins is thereby extremely deteriorated (see "Reinforced Plastics," vol. 14, No. 6, p. 36 and "Metallic Materials," vol. 9, No. 11, p. 61).

For example, styrene type resins are excellent in rigidity, dimentional stability and molding processability. But they are deficient in such properties as mechanical or thermal property and are not suitable for structural parts. Improvement of such drawbacks by way of glass fiber reinforcement has therefore greatly been expected. In fact, such a method has found practical applications. However, the deterioration of molding processability suffered therefrom is so much that the field for application is very limited.

Polyphenylene ether resins are so called engineering plastics having extraordinarily excellent thermal property, mechanical property, electric characteristic which were not found in conventional thermoplastic resins, and the fields for broad applications are ready to develop. However, their uses have been limited because of several drawbacks in connection with higher glass transition temperatures thereof; e.g. molding processability is poor, a large scale molded article cannot be obtained therefrom, a molded article is accompanied with molding distortion, etc. Among the methods heretofore proposed for improving the molding processability of polyphenylene ether resins, there are known blending methods which comprise admixing therewith a large amount of polystyrene, styrene-acrylonitrile copolymer, styrene-acrylonitrilebutadiene copolymer or the like. However, they may be practised only at the sacrifice of the advantage of thermal property and mechanical strength which characterizes polyphenylene ether resins. Aromatic polycarbonate resins are most promising resins among so-called engineering plastics having high impact strength as well as excellent heat resistance. Their uses are recently expanding rapidly. However, they have drawbacks in molding processability. Moreover, on account of creep deformation which is a peculiarity of plastics in general, there are found little demands for them in the field of large scale molded articles. Aromatic polysulphone resins are heat-resistant resins highly appreciated for their excellent electric property as well as well-balanced physical properties. However, since they are non-crystalline polymers having high glass transition temperatures, molding temperatures are extremely high. It is very difficult, therefore, to produce shaped articles without distortion by conventional molding techniques. Based on such a reason, their uses have heretofore been limited to special fiields.

The present inventors have studied extensively about the improvement of glass fiber reinforced thermoplastic resins with an aim to overcome the drawbacks of various thermoplastic resins as described above. We have now found that a glass fiber reinforced resinous composition wherein uncured epoxy resins are admixed with non-crystalline thermoplastic resins is extremely improved in molding processability without losing the advantage of the glass fiber reinforcement.

SUMMARY OF THE INVENTION

An object of the present invention is to provide a glass fiber reinforced thermoplastic resinous composition, which contains 5 to 50 wt. percent glass fiber based on the total weight of resinous composition comprising 99.5 to 55 wt. percent non-crystalline thermoplastic resins and 0.5 to 45 wt. percent uncured epoxy resins.

Another object is to provide a preparation method of the glass fiber reinforced thermoplastic resinous composition as specified above.

Further object is to provide molded articles having excellent physical properties such as impact strength, flexural strength, heat distortion temperature, thermal expansion coefficient, dimensional stability and the like.

Still further objects will become apparent in the following description hereinafter disclosed.

In the glass fiber reinforced thermoplastic resinous composition according to the present invention, uncured epoxy resins are dispersed in the matrix of non-crystalline thermoplastic resins containing glass fibers in particles in the state of "islands." This "island-sea" structure may be observed by means of a phase contrast microscope, an electron microscope or the like. For example, a sample was sandwiched between two slide glasses, melted and pressed to form a thin film. The result of observation of this thin film by a phase contrast microscope showed that uncured epoxy resins were dispersed in the non-crystalline matrix resin containing glass fibers in particles having a diameter of 0.05 to 10$\mu$, in most cases, 0.1 to 5$\mu$. The resinous compositions according to the present invention are the composite materials having a complex "island-sea" structure. Therefore, even if a large amount of uncured epoxy resins having lower softening temperatures may be contained in the composition, lowering of heat-resistant temperature of the resinous composition according to the present invention is small and the physical properties such as surface hardness, friction resistance or the like remain unvaried just like those of glass fiber reinforced non-crystalline resins.

The resinous compositions according to the present invention which contain more than two different species of resins having different melt-flow behaviors are characterized particularly in that the molding processability of them is extremely improved, although glass fibers are present in the compositions.

(I) THERMOPLASTIC RESINS

(a) Styrene type polymers

The styrene type polymers herein used may be any polymer containing styrene as main component, including homopolymers of styrene and copolymers of styrene with at least one compound selected from the group of compounds consisting of α-methyl styrene, chlorostyrene, methyl methacrylate, acrylonitrile and other copolymerizable vinyl compounds. They may further include polymers reinforced by rubbers such as rubber reinforced polystyrene, styrene-acrylonitrile-butadiene copolymer and the like.

(b) Polyphenylene ether resins

The polyphenylene ether resins which may be used in the present invention are polymers of aromatic polyethers having substituents at 2 and 6 positions which may be represented by the following formula:

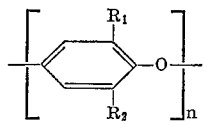

wherein $R_1$ and $R_2$ represent the same or different monovalent substituents, and $n$ signifies the degree of polymerization.

The mixtures of polyphenylene ether resins with styrene type polymers herein used may preferably be a composition comprising 90 to 10 wt. percent polyphenylene ether resins and 10 to 90 wt. percent styrene type polymers.

(c) Aromatic polycarbonate resins

The aromatic polycarbonate resins which may be used in the present invention are polymers which may be obtained by allowing bifunctional phenols to react with carbonate precursors such as phosgene, halogenated formates, carbonate esters or the like, represented by the following formula:

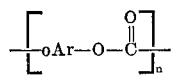

wherein Ar signifies a divalent aromatic residual group and $n$ signifies the degree of polymerization. A typical example of this polymer is a polycarbonate derived from 2,2-bis(4-hydroxyphenyl)propane.

(d) Aromatic polysulphone resins

The aromatic polysulphone resins which may be used in the present invention are polymers containing sulphonic groups directly bonded to the aromatic nucleus in the main chain, represented by the following formula:

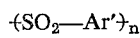

$+(SO_2-Ar')_n$ wherein Ar' signifies a divalent aromatic residual group and $n$ signifies the degree of polymerization. A typical example is a polysulphone resin obtained by condensation reaction of 4,4'-dichlorodiphenyl sulphone and 2,2-bis(4-hydroxyphenyl)propane.

(II) UNCURED EPOXY RESINS

The uncured epoxy resins which may be used in the present invention may include various well-known solid uncured epoxy resins. The epoxy resins commercially available in general are condensates of polyfunctional phenols and polyfunctional halohydrins. The polyfunctional phenols may include resorcin, various bisphenols which are condensates of phenol with aldehydes or ketones such as formaldehyde, acetaldehyde, acetone, methyl ethyl ketone or the like, and a low molecular weight phenolaldehyde condensate, i.e. novolak resin. The polyfunctional halohydrin is, for example, epichlorohydrin. The epoxy resin particularly preferred in the present invention is an epoxy resin which is a reaction product of 2,2-bis(4-hydroxyphenyl)propane and epichlorohydrin.

Uncured epoxy resins are usually characterized by epoxy equivalent, hydroxy group (—OH) equivalent, molecular weight and the like. The molecular weight of uncured epoxy resin is the most important in order to improve the properties of the resinous composition according to the present invention, such as Izod impact strength and molding processability, with the good heat resistance such as heat distortion temperature or the like unvaried. In the resinous composition of the present invention, an epoxy resin having the molecular weight in the range of 500 to 50,000, preferably 1,000 to 30,000, may be used.

In addition to the most easily available epoxy resins as described above, the epoxy resins which may be used in the resinous composition according to the present invention may further include other resins as long as they have the characteristics as specified above. For example, the resins which are improved in heat resistance and chemical resistance after curing such as epoxy-novolak resins may be used. Furthermore, uncured epoxy resins modified by blending or copolymerization to impart such properties as flame resistance, flexibility or the like may also be used.

As already stated above, the resin portion in the resinous composition according to the present invention must form the "island-sea" structure. The scope of the present invention is that the uncured epoxy resins are added in an amount of 45 wt. percent or less based on the weight of whole resin portion so that the non-crystalline thermoplastic resin may support the "sea" portion, i.e. the continuous phase, stably. On the other hand, in order to obtain the effect of epoxy resin addition, i.e. in order to achieve a conspicuous improvement in molding processability, at least 0.5 wt. percent, preferably 1.0 wt. percent, of the uncured epoxy resin should be added based on the weight of the whole resin portion.

(III) GLASS FIBERS

In the resinous composition according to the present invention, the content of glass fiber is 5 to 50 wt. percent, preferably 10 to 40 wt. percent. In the non-crystalline amount of epoxy resins are compounded, lowering of mechanical strength is so much if no glass fiber reinforcement is applied. Therefore, at least 5 wt. percent, preferably 10 wt. percent, of glass fibers should be added to said composition. In general, molding processability becomes deteriorated as the increase in amount of the glass fibers added, which is not exceptional in the present invention. The upper limit of the amount of the glass fibers to be added is 50 wt. percent, preferably, 40 wt. percent. The physical properties of the resinous composition are greatly influenced by the species and forms of the glass fibers, the surface treatments applied therefor and the sheafing agents added thereto. In order to obtain preferable physical properties, the length of glass fibers should desirably be 0.2 mm. or more and their diameter be 5 to 50μ. As surface treating agents, silane type treating agents such as aminosilane, vinyl silane, epoxy silane or the like may preferably be used. As sheafing agents for glass fibers, polyester type, epoxy type, ethylene-vinylacetate type resins may preferably be used.

(IV) OTHER ADDITIVE RESINS AND ADDITIVE AGENTS

Other additive resins and/or additive agents may also be compounded in the glass fiber reinforced thermoplastic resinous composition according to the present invention. The additive resins herein used may include at least one resin selected from the groups consisting of polymethyl methacrylate, polyethylene, polypropylene, nylon and polyester. They may be added in an amount so as not to deteriorate the characteristics of the non-crystalline resinous thermoplastic resins. The additive agents may include lower molecular weight substances in general, such as coloring agents, pigments, anti-inflammable agents, stabilizers, plasticizers, lubricants, releasing agents, fillers, extenders and the like.

PREPARATION OF THE RESINOUS COMPOSITION OF THE PRESENT INVENTION

The resinous composition according to the present invention may be produced by any conventional method. For example, the method for adding glass fibers to the resinous composition may be either vent addition method, covering method, hopper-blend method or the like. To explain more precisely, the glass fibers may be added at the same time with the fusing of the non-crystalline thermoplastic resins and uncured epoxy resins after dry-blend thereof. Alternatively, the resinous mixture may first be prepared before addition of glass fibers according to a fusion mixing by means of an extruder, a heated roller, a banbury mixer, a kneader-blender or the like. Furthermore, there may also be used a method wherein uncured epoxy resins are added afterwards to the glass fiber reinforced non-crystalline thermoplastic resins or a method wherein the compostion of uncured epoxy resins and glass fibers previously prepared are added to non-crystalline thermoplastic resins.

For special purposes, curing agents may also be added to the resin portion in an amount which will not badly affect the molding processability.

The resinous composition according to the present invention, wherein molding process ability and impact strength are improved at the same time, have many practical advantages in molding process such as easiness in molding of a large scale shaped article or a shaped article having a complicated structure and the like. The shaped articles obtained from the resinous composition of the present invention are excellent in impact strength or the like as compared with those of prior art. Thus, the present invention is practically extremely significant. The improvement of molding processability may be represented by the decrease in injection pressure and/or injection temperature at the time of molding.

The glass fiber reinforced styrene type resinous composition obtained according to the present invention wherein uncured epoxy resins are compounded provides an entirely novel composition which is extremely improved in mechanical strength as well as in thermal properties without deterioration of excellent molding processability inherent in styrene type resins. The polyphenylene ether resin composition wherein uncured epoxy resins and glass fibers are compounded with polyphenylene ether resins or mixtures comprising polyphenylene ether resins and styrene type resins also provide new molding materials. They are extremely improved in mechanical properties, such as tensile strength, flexural strength, Izod impact strength and the like as well as in molding processability, while maintaining the same heat distortion temperature and linear expansion coefficient as in polyphenylene ether resins or mixtures comprising polyphenylene ether resins and styrene type resins. The aromatic polycarbonate resinous composition according to the present invention wherein uncured epoxy resins and glass fibers are compounded provide a novel molding composition which is greatly improved in heat distortion temperature as well as in molding processability, while perfectly maintaining the characteristics of aromatic polycarbonate resins as engineering plastics. The aromatic polysulphone resinous composition according to the present invention wherein uncured epoxy resins and glass fibers are compounded are also extremely improved in molding processability. The original characteristics are also maintained thereby. This kind of molding material may be expected to be put into very extensive practical applications.

Having generally described the present invention it will now be explained more precisely by referring to the following examples, by which the present inventors have no intention to limit the scope of the present invention. In the examples, "parts" and "%" signify "parts by weight" and "percent by weight," respectively.

EXAMPLE 1

90 parts of polyphenylene ether obtained by polymerizing 2,6-dimethyl phenol (hereinafter referred to only as polyphenylene ether) and 10 parts of solid epoxy resin produced mainly from 2,2-bis(4-hydroxyphenyl)propane and epichlorohydrin (hereinafter referred to only as epoxy resin) having an average molecular weight of 8,000 (trademark: Dow D.E.R. 669) were subjected after dry-blending to fusion mixing by means of a biaxial extruder wherein two screws rotated in the opposite direction, whereby the cylinder temperature was adjusted to 310° C. The resinous composition obtained was then admixed with glass fibers by fusion kneading. 70 parts of the resinous composition and 30 parts of glass fibers (7 mm. length and 10μ diameter) treated with vinyl silane were fed at the vent of a vent-attached extruder whereby the cylinder temperature was adjusted to 330° C. The thus obtained glass fiber reinforced resinous composition was shaped by injection molding. The physical properties of this shaped specimen were measured to obtain the results as shown in Table 1. For comparison, the results obtained for the glass fiber reinforced resinous composition containing no epoxy resin are also shown in the same table. The results in Table 1 show that the glass fiber reinforced resinous composition is greatly improved in molding processability as well as in impact strength.

TABLE 1

| | Ex. 1 | Comparative ex. |
|---|---|---|
| Injection molding temperature (° C.) | 310 | 360 |
| Injection molding pressure (kg./cm.²) | 1,200 | 1,300 |
| Izod impact strength (kg. cm./cm.) | 15.5 | 11.3 |
| Tensile strength (kg./cm.²) | 1,260 | 1,260 |
| Heat distortion temperature (° C.) | 194 | 194 |

EXAMPLE 2

Two different species of resinous compositions were prepared. One, referred to as "resin A," was prepared from 90 parts of polystyrene (trademark: Asahi-Dow 666) and 10 parts of epoxy resin having a molecular weight of 3600 (trademark: Dow-DER 667). The other, referred to as "resin B," was prepared from 90 parts of the same polystyrene and 10 parts of epoxy resin having a molecular weight of 8000 (trademark: Dow-DER 669). Each resinous composition was prepared by first dry blending and then fusion mixing in a vent-attached extruder whereby the cylinder temperature was adjusted to 230° C. To each resinous composition was thereafter added at the vent of the extruder glass fibers (7 mm. length and 10μ diameter) treated with vinyl silane, whereby the compounding ratio was 20 parts of glass fibers to 80 parts of each resinous composition. The glass fiber reinforced resinous composition thus obtained was shaped by injection molding for measurement of physical properties thereof. The results are given in Table 2, together with those of the polystyrene (PS) reinforced by 20% of glass fibers treated with vinyl silane which were obtained according to the same preparation method. Table 2 apparently shows that the resinous composition modified by the addition of epoxy resin is extremely enhanced in molding processability as well as in impact strength.

TABLE 2

|  | Comparative Ex. PS | Ex. 2 | |
|---|---|---|---|
|  |  | Resin A | Resin B |
| Injection molding temperature (° C.) | 220 | 200 | 200 |
| Injection molding pressure (kg./cm.²) | 800 | 700 | 750 |
| Izod impact strength (kg. cm./cm.) | 5.0 | 7.5 | 7.6 |
| Tensile strength (kg./cm.²) | 1,050 | 1,070 | 1,080 |
| Flexural strength (kg./cm.²) | 1,260 | 1,300 | 1,300 |
| Heat distortion temperature (° C.) | 93 | 94 | 95 |

EXAMPLE 3

A glass fiber reinforced resinous composition (A) comprising 76 parts of styrene-acrylonitrile copolymer containing 25% acrylonitrile (hereinafter referred to as AS resin), 4 parts of epoxy resin and 20 parts of glass fibers treated with aminosilane and a glass fiber reinforced resinous composition (B) comprising 64 parts of AS resin, 16 parts of epoxy resin and 20 parts of glass fibers treated with vinyl silane were prepared according to the same procedure as described in Example 2 except that the cylinder temperature of the extruder was adjusted to 250° C. The results of measurement of physical properties after injection molding are given in Table 3 together with those measured for the AS resin reinforced by 20% of glass fibers treated with vinyl silane.

TABLE 3

|  | Comparative Ex. AS | Ex. 3 | |
|---|---|---|---|
|  |  | (A) | (B) |
| Injection molding temperature (° C.) | 240 | 230 | 200 |
| Injection molding pressure (kg./cm.²) | 900 | 850 | 800 |
| Izod impact strength (kg. cm./cm.) | 5.6 | 7.2 | 9.2 |
| Tensile strength (kg./cm.²) | 1,080 | 1,080 | 1,150 |
| Flexural strength (kg./cm.²) | 1,270 | 1,300 | 1,320 |
| Heat distortion temperature (° C.) | 96 | 96 | 97 |

EXAMPLE 4

A glass fiber reinforced resinous composition was prepared from 72 parts of ABS resin containing 49% styrene, 25% acrylonitrile and 26% butadiene, 8 parts of epoxy resin and 20 parts of glass fibers treated with aminosilane according to the same procedure as described in Example 1 except that the cylinder temperature of the extruder was adjusted to 260° C. The results of measurement of the physical properties after injection molding are given in Table 4 together with those of the ABS resin reinforced by 20% of glass fibers treated with vinyl silane.

TABLE 4

|  | Comparative Ex. ABS | Ex. 4 |
|---|---|---|
| Injection molding temperature (° C.) | 250 | 220 |
| Injection molding pressure (kg./cm.²) | 1,000 | 900 |
| Izod impact strength (kg. cm./cm.) | 9.5 | 12.3 |
| Tensile strength (kg./cm.²) | 970 | 1,020 |
| Flexural strength (kg./cm.²) | 1,280 | 1,290 |
| Heat distortion temperature (° C.) | 94 | 95 |

EXAMPLE 5

45 parts of polyphenylene ether, 45 parts of polystyrene and 10 parts of the solid epoxy resin as used in Example 1 were subjected, after dry-blending, to fusion mixing by means of a biaxial extruder wherein two screws rotated in the opposite direction, whereby the cylinder temperature was adjusted to 290° C. This resinous composition was admixed with glass fibers treated with vinyl silane (7 mm. length and 10μ diameter) by fusion kneading at the vent of the vent-attached extruder, of which the cylinder temperature was adjusted to 320° C. whereby the compounding ratio was controlled to 20 parts of the glass fibers to 80 parts of the resinous composition. The glass fiber reinforced resinous composition obtained was then shaped by injection molding for measurement of physical properties thereof to give the results as shown in Table 5. As apparently seen from the Table 5, the resinous composition modified by the addition of epoxy resin is extremely improved in molding processability as well as in impact strength. Table 5 also includes the results obtained for the glass fiber reinforced resinous composition which was prepared according to the same procedure as described in Example 5 except that no epoxy resin was compounded.

TABLE 5

|  | Ex. 5 | Comparative ex. |
|---|---|---|
| Injection molding temperature (° C.) | 260 | 310 |
| Injection molding pressure (kg./cm.²) | 1,100 | 1,300 |
| Izod impact strength (kg. cm./cm.) | 12.7 | 7.1 |
| Tensile strength (kg./cm.²) | 1,250 | 1,100 |
| Heat distortion temperature (° C.) | 147 | 147 |

EXAMPLE 6

A glass fiber reinforced resinous composition was prepared from 67 parts of polycarbonate resin produced mainly from 2,2-bis(4-hydroxyphenyl)propane and phosgene (hereinafter referred to as polycarbonate resin or PC), 13 parts of epoxy resin and 20 parts of glass fibers treated with vinyl silane according to the same procedure as described in Example 1 except that the cylinder temperature of the extruder was adjusted to 280° C. Table 6 shows the injection molding conditions and the physical properties of the molded articles obtained from this resinous composition, together with those of comparative example, which is the polycarbonate resin admixed with 20% of glass fibers treated vinyl silane.

TABLE 6

|  | Ex. 6 | Comparative Ex. PC |
|---|---|---|
| Injection molding temperature (° C.) | 285 | 310 |
| Injection molding pressure (kg./cm.²) | 1,150 | 1,300 |
| Izod impact strength (kg. cm./cm.) | 28 | 8.5 |
| Tensile strength (kg./cm.²) | 1,280 | 1,300 |
| Heat distortion temperature (° C.) | 151 | 150 |

EXAMPLE 7

A glass fiber reinforced resinous composition was prepared from 72 parts of polysulphone resin obtained by alkali-condensation reaction of 4,4'-dichlorodiphenyl sulphone and 2,2-bis(4-hydroxyphenyl)propane (hereinafter referred to as polysulphone resin), 8 parts of epoxy resin and 20 parts of glass fibers treated with aminosilane according to the same procedure as described in Example 1 except that the cylinder temperature of the extruder was adjusted to 320° C. Table 7 shows the injection molding conditions and the physical properties of the molded articles obtained from this resinous composition, together with those of comparative example, which is a polysulphone resin compounded with 20% of glass fibers treated with aminosilane.

TABLE 7

|  | Ex. 7 | Comparative ex. |
|---|---|---|
| Injection molding temperature (° C.) | 320 | 350 |
| Injection molding pressure (kg./cm.²) | 1,300 | 1,400 |
| Izod impact strength (kg. cm./cm.) | 15 | 6.2 |
| Tensile strength (kg./cm.²) | 1,350 | 1,300 |
| Heat distortion temperature (° C.) | 182 | 182 |

EXAMPLE 8

Various resinous compositions were prepared from 45 parts of polyphenylene ether, 45 parts of polystyrene and 10 parts of epoxy resin by varying the molecular weight of the solid epoxy resin obtained from principal raw materials of 2,2-bis(4-hydroxyphenyl)propane and epichlorohydrin. The preparations were conducted according to the same method under the same conditions as described in Example 5. 80 parts of each resinous composition were admixed with 20 parts of glass fibers similarly as described in Example 5 to prepare a glass fiber reinforced resinous composition. Evaluation tests were carried out to obtain the results as shown in Table 8.

TABLE 8

| Ex. | Molecular weight of epoxy resin | Injection molding conditions | | Izod impact strength (kg. cm./cm.) | Tensile strength (kg./cm.²) | Heat distortion temperature °C. |
| --- | --- | --- | --- | --- | --- | --- |
| | | Temperature, °C. | Pressure (kg./cm.²) | | | |
| 8 (A) | 900 | 250 | 1,000 | 11.5 | 1,100 | 146 |
| 8 (B) | 4,000 | 260 | 1,100 | 12.0 | 1,250 | 146 |
| 5 | 8,000 | 260 | 1,100 | 12.7 | 1,250 | 147 |
| 8 (C) | 15,000 | 260 | 1,100 | 12.5 | 1,300 | 147 |
| 8 (D) | 40,000 | 270 | 1,100 | 13.0 | 1,300 | 147 |

EXAMPLE 9

Various glass fiber reinforced resinous compositions were prepared from a resinous composition comprising 45 parts of polyphenylene ether, 45 parts of polystyrene and 10 parts of the epoxy resin as used in Example 5 and glass fibers according to the same procedure as described in Example 5, whereby the amount of glass fibers added was varied. The results of evaluation tests thereof are listed in Table 9.

TABLE 9

| Ex. | Amount of glass fiber (percent) | Injection molding conditions | | Izod impact strength (kg./cm./cm.) | Tensile strength (kg./cm.²) | Heat distortion temperature °C. |
| --- | --- | --- | --- | --- | --- | --- |
| | | Temperature, °C. | Pressure (kg./cm.²) | | | |
| 9 (A) | 10 | 250 | 1,100 | 8.1 | 1,000 | 145 |
| 5 | 20 | 260 | 1,100 | 12.7 | 1,250 | 147 |
| 9 (B) | 30 | 270 | 1,200 | 14.0 | 1,300 | 149 |
| 9 (C) | 40 | 270 | 1,300 | 14.8 | 1,350 | 150 |

EXAMPLE 10

A resinous composition was prepared from 40 parts of polyphenylene ether, 20 parts of polystyrene, 30 parts of styrene-acrylonitrile copolymer containing 25% acrylonitrile and 10 parts of epoxy resin as used in Example 1 according to the same procedure as described in Example 5. 80 parts of this resinous composition were admixed with 20 parts of glass fibers treated with vinyl silane (7 mm. length and 10μ diameter) similarly as described in Example 5. After injection molding of this product, physical properties thereof were measured to obtain the results as shown in Table 10. For comparison, in Table 10 are also listed those of a glass fiber reinforced resinous composition which was prepared according to the same procedure as described in the present example except that no epoxy resin was compounded.

TABLE 10

| | Ex. 10 | Comparative ex. |
| --- | --- | --- |
| Injection molding temperature (°C.) | 250 | 290 |
| Injection molding pressure (kg./cm.²) | 1,100 | 1,300 |
| Izod impact strength (kg. /cm./cm.) | 13.6 | 8.5 |
| Tensile strength (kg./cm.²) | 1,100 | 1,000 |
| Heat distortion temperature (°C.) | 155 | 155 |

EXAMPLE 11

A resinous composition comprising 55 parts of polyphenylene ether, 35 parts of polycarbonate produced mainly from 2,2-bis(4-hydroxyphenylene)propane and phosgene and 10 parts of the epoxy resin as used in Example 1 was prepared by fusion mixing with a biaxial extruder, whereby the cylinder temperature was adjusted to 320° C. 70 parts of this resinous composition and 30 parts of the glass fibers as used in Example 1 were compounded according to the same procedure as described in Example 5 except that the cylinder temperature was adjusted to 310° C., in order to prepare a glass fiber reinforced resinous composition. After injection molding, physical properties of this product were measured. The results are given in Table 11 together with those of the glass fiber reinforced resinous composition produced similarly as in Example 11 except that no epoxy resin was compounded.

TABLE 11

| | Ex. 11 | Comparative ex. |
| --- | --- | --- |
| Injection molding temperature (°C.) | 280 | 330 |
| Injection molding pressure (kg./cm.²) | 1,100 | 1,300 |
| Izod impact strength (kg. cm./cm.) | 15.4 | 13.2 |
| Tensile strength (kg./cm.²) | 1,350 | 1,250 |
| Heat distortion temperature (°C.) | 163 | 163 |

EXAMPLE 12

Various resinous compositions were prepared from 50 parts of polyphenylene ether, 50 parts of polystyrene and epoxy resin whose amount was varied, according to the same procedure as described in Example 5. 80 parts of each resinous composition was compounded with 20 parts of glass fibers to prepare a glass fiber reinforced resinous composition. After injection molding, physical properties of each shaped article were measured to give the results as shown in Table 12.

TABLE 12

| Exc | Amount of epoxy resin in the resin phase (percent) | Injection molding conditions | | Izod impact strength (kg. cm./cm.) | Tensile strength (kg./cm.²) | Heat distortion temperature, °C. |
| --- | --- | --- | --- | --- | --- | --- |
| | | Temperature °C. | Pressure (kg./cm.²) | | | |
| 12(A) | 2 | 285 | 1,100 | 8.2 | 1,200 | 147 |
| 5 | 10 | 260 | 1,100 | 12.7 | 1,250 | 147 |
| 12(B) | 20 | 240 | 900 | 13.5 | 1,300 | 147 |
| 12(C) | 30 | 230 | 700 | 11.0 | 1,300 | 146 |
| 12(D) | 40 | 210 | 700 | 9.2 | 1,200 | 144 |

What is claimed is:

1. A glass fiber reinforced thermoplastic resin composition comprising 5 to 50 weight percent glass fibers based on the weight of the resinous composition which consists of 99.5 to 55 weight percent of a non-crystalline thermoplastic resin selected from the group consisting of styrene resins, polyphenylene ether resins, aromatic polycarbonate resins and aromatic polysulphone resins and 0.5 to 45 weight percent of uncured epoxy resin containing an epoxy group and a molecular weight in the range of 500 to 50,000.

2. The glass fiber reinforced thermoplastic resinous composition according to claim 1, wherein the uncured epoxy resin has a molecular weight in the range of 1000 to 30000.

3. The glass fiber reinforced thermoplastic resinous composition according to claim 1 wherein the styrene resin is selected from the group consisting of (1) styrene homopolymers, (2) copolymers of styrene with at least one compound selected from the group consisting of α-methyl styrene, chlorostyrene, methyl methacrylate, acrylonitrile, (3) rubber reinforced polystyrene, and (4) styrene-acrylonitrile-butadiene copolymer.

4. The glass fiber reinforced thermoplastic resinous composition according to claim 1, wherein the non-crystalline thermoplastic resin is styrene resin.

5. The glass fiber reinforced thermoplastic resinous composition according to claim 1, wherein the non-crystalline thermoplastic resin is polyphenylene ether resin or a mixture of polyphenylene ether resin and styrene resin.

6. The glass fiber reinforced thermoplastic resinous composition according to claim 1, wherein the non-crystalline thermoplastic resin is aromatic polycarbonate resin.

7. The glass fiber reinforced thermoplastic resinous composition according to claim 1, wherein the non-crystalline thermoplastic resin is aromatic polysulphone resin.

8. The glass fiber reinforced thermoplastic resinous composition according to claim 1, wherein the non-crystalline thermoplastic resin is styrene-acrylonitrile-butadiene copolymer.

9. The glass fiber reinforced thermoplastic resinous composition according to claim 1, wherein the non-crystalline thermoplastic resin is styrene-acrylonitrile copolymer.

10. The glass fiber reinforced thermoplastic resinous composition according to claim 1, wherein the non-crystalline thermoplastic resin is poly(2,6-dimethylphenylene-1,4-ether).

11. The glass fiber reinforced thermoplastic resinous composition according to claim 1, wherein the non-crystalline thermoplastic is a mixture of 90 to 10 wt. percent poly(2,6 - dimethylphenylene - 1,4 - ether) and 10 to 90 wt. percent polystyrene.

12. The glass fiber reinforced thermoplastic resinous composition according to claim 1, wherein glass fibers are contained in an amount of 20 to 40 wt. percent.

13. The glass fiber reinforced thermoplastic resinous composition according to claim 1, wherein the uncured epoxy resin is a reaction product of 2,2-bis(4-hydroxyphenyl)propane and epichlorohydrin.

References Cited
UNITED STATES PATENTS

| | | | |
|---|---|---|---|
| 3,375,298 | 3/1968 | Fox | 260—83 OR |
| 3,639,331 | 2/1972 | Hattori et al. | 260—37 PC UX |
| 2,962,462 | 11/1960 | Chapin et al. | 260—837 R X |
| 3,542,711 | 11/1970 | Manasia et al. | 260—837 R X |
| 3,542,902 | 11/1970 | Dunion et al. | 260—837 R X |
| 3,396,142 | 8/1968 | Little et al. | 260—47 AG |
| 3,654,219 | 4/1972 | Boyer et al. | 260—41 AG X |

LEWIS T. JACOBS, Primary Examiner

U.S. Cl. X.R.

260—37 R, 37 PC, 37 EP, 41 AG, 830 R, 837